June 23, 1936. A. CARLSON 2,045,342
CLINOMETER FOR SURVEYING DIAMOND DRILL HOLES
Filed Nov. 7, 1934
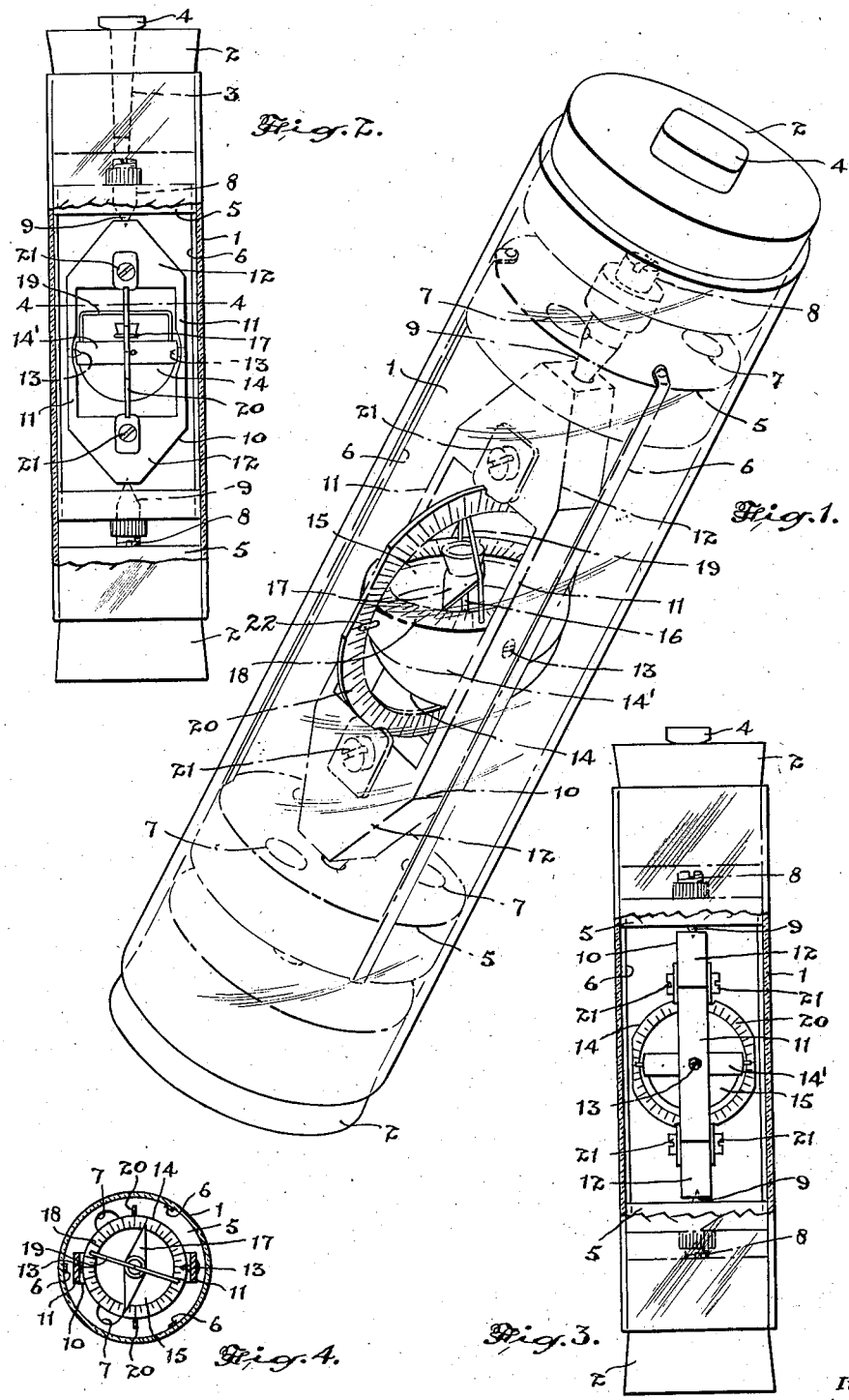
Inventor.
Adolph Carlson.

Patented June 23, 1936

2,045,342

UNITED STATES PATENT OFFICE 2,045,342

CLINOMETER FOR SURVEYING DIAMOND DRILL HOLES

Adolph Carlson, South Porcupine, Ontario, Canada

Application November 7, 1934, Serial No. 751,831

4 Claims. (Cl. 33—205)

The principal objects of this invention are, to provide an instrument in which the recording elements have universal movement to indicate the relative inclination of a drill hole in which said instrument is placed.

A further object is to devise a simple form of device which will be extremely sensitive and which will be free from failures due to mechanical difficulties.

The principal feature of the invention consists in the novel construction and arrangement of a universally mounted compass member capable of swinging freely to any position of adjustment vertical or horizontal, free of contact with any mechanism or element liable to interfere with its accurate adjustment.

A further and important feature consists in the novel construction of a weighted member mounted on journals in a member supported upon pivot bearings arranged at right angles to the axis of the aforesaid bearings, and of the arrangement of a gauge encircling said weighted member to indicate the relative position of the members and the inclination of the hole.

In the accompanying drawing, Figure 1 is an enlarged perspective view of my improved clinometer shown in an oblique position.

Figure 2 is an elevational view in part section showing the meter in a vertical position.

Figure 3 is an elevational part sectional view showing the internal part of the meter in a right angular position to that shown in Figure 2.

Figure 4 is a horizontal sectional view taken on the line 4—4 of Figure 2.

In the mining industry it is customary to drill prospect holes with a diamond drill which removes a core of rock so that the engineers may determine the quality of rock through which the drill is passing at various depths. Such holes are bored, both vertically and horizontally, and on account of the varying conditions of the drill encountering faults and different kinds of rock its direction may be diverted in various directions.

The present invention has been devised in order to definitely determine the relative angularity of the hole at any desired depth. When drilling a hole the drill may be withdrawn at any depth and a tool is inserted carrying the measuring instrument.

The instrument as herein shown consists of a glass tube 1 which is closed at the ends by the rubber plugs 2, one of which is provided with an orifice 3 which is closed by a suitable plug 4.

Within the tube 1 and arranged between the closing plugs 2 is a cage device formed of a pair of discs 5 which are rigidly spaced apart by a plurality of bars 6 which are rigidly secured to said discs. The discs are provided with a plurality of holes 7 arranged in balanced arrangement in relation to the connecting bars.

In the centre of each of said discs is arranged a threaded screw 8, the inner conical end 9 of which projects beyond the inner side of each disc.

A member 10 having parallel side bars 11 and tapered ends 12 is pivotally supported at the tapered ends upon the cone ends 9 of the screws 8.

Pivot pins 13 are mounted intermediate of the length of the side bars 11 of said member 10 and a hemispherical member 14 is pivotally suspended thereon between said side bars.

The hemispherical member 14 is formed of a solid block of heavy metal, such as brass or bronze, and is provided with a circular recess 15 in its top side.

A rim 14' encircles the upper portions of the member 14 and presents an annular shoulder to engage the holding media as will hereinafter be explained.

A pin 16 is axially mounted within the hemispherical member in right angular relation to the axis of the bearing pivots 13 and upon this pin is mounted a compass needle 17, the ends of which rotate in close proximity to the circular rim 18 of the hemispherical member surrounding the recess 15 therein. This rim is marked with graduations dividing the same into the degrees of the circle.

A bar 19 of substantially inverted U shape is secured in the rim of the hemispherical member 14 and extends over the needle 17 to prevent its dislodgement from the spindle.

A ring 20 suitably graduated to indicate the degrees of a circle is rigidly mounted on the pivotal member 10 by the lugs and fastening screws 21 so that the centre of the ring is in alignment with the axis of the pivot pins 13 upon which the weighted hemisphere is mounted. The hemispherical member thus swings upon its pivots within said ring and pointer members 22 are secured in the hemispherical member 14 to indicate on the graduated ring the relative position of the weighted hemisphere.

It will be understood that the compass is thus supported in gimbals or the equivalent thereof, so that the weight of the hemispherical member will hold the compass in a substantially horizontal position no matter what movement of the glass tube occurs, or in what direction said tube lies.

The instrument thus described is of such a nature that the frame member 10 has suspended between its sides a depending weight in the form of the hemispherical member 14, which is carried on the pivots 13, and, as the member 10 is mounted on the cone points of the screws 8 the said member oscillates freely. Universal movement is thus provided for.

In the use of this device, when it is desired to ascertain the exact position of a drill bit in a hole the tool is withdrawn and the instrument herein described is prepared for insertion into the hole. The entire instrument is heated to a temperature equal to or slightly above the temperature of melted gelatin and melted gelatin is poured into the cavity enclosed between the rubber plugs 2 through the orifice 3. The gelatin flows freely through the holes in the discs 5 and fills the interior of the tube completely surrounding the instrument portion supported in the gimbals.

Gelatin when melted is of very low viscosity and permits the free movement of the pivotal supporting elements including the compass needle.

The instrument is then inserted within a suitable holder and it is then introduced into the drill hole to the distance where measurement is required. It is then allowed to remain a sufficient length of time in a fixed position until the gelatin within the tube has become solidified owing to the temperature conditions.

The various pivotal elements of the device will have assumed, in a free movement within the liquid gelatin, certain well defined positions, so that the compass needle will point to certain of the indicator markings on the rim 18 of the hemispherical member and the indicator pointers 22 attached to the hemispherical member will be directed to the graduation markings on the ring 20. The solidification of the gelatin will hold these members in a fixed position engaging the shoulder 14' so that their subsequent movement in withdrawing the instrument from the hole will not alter the assumed position.

When the instrument is recovered, the position of the compass needle held fixed by the gelatin will indicate the direction of the hole in respect to compass directions and the position of the pointers of the hemispherical member will indicate the divergence of the hole from either a horizontal or vertical direction in whichever type of hole the device is used.

There are no mechanical parts within the device for holding the gimbal supported members in any fixed position. The holding of these members is accomplished through the solidification of the gelatin poured into the tube container and a very accurate result is achieved, while permitting perfect freedom of the swinging members in the changes of angularity to which it may be subjected. There will be no difficulties encountered through mechanical faults of various devices, as both the hemispherical member and its swivel support are mounted on the simplest types of bearings which may be maintained in perfect balancing arrangement.

The device is inexpensive and can be used in various places and wherever diamond drilling is required.

What I claim as my invention is:—

1. A clinometer comprising a transparent tube sealed at the ends, a cage enclosed within said transparent tube and having fixed ends, bearings mounted in said cage ends, a frame pivoted between said bearings, a pendant weighted member journalled between the sides of said frame and capable of swinging a complete revolution about its pivot axis, a compass mounted on the top of said pendant member, a circular scale mounted in said frame and indicatively co-operative with said pendant member at any point in the complete revolution thereof, and a congealable transparent fluid filling said tube around the movable members mounted therein.

2. A clinometer comprising a pair of discs spaced apart and each having a point bearing therein, a plurality of bars rigidly connecting said spaced discs, a frame member pivotally mounted between said point bearings, bearings arranged in the sides of said frame midway of their length, a hemi-spherical weighted member journalled in said frame between said bearings, a ring rigidly mounted in said frame in a plane transverse to said bearings and having degree graduations thereon, a pointer on said hemi-spherical member indicating the angularity of swing of the hemi-spherical member, a compass mounted on said hemi-spherical member, a transparent tube sealed at the ends and enclosing all of said assembled elements, and a congealable transparent fluid enclosed in said tube and surrounding said enclosed elements.

3. A clinometer comprising a transparent tube sealed at the ends, an open cage structure arranged in said tube, an open frame journalled in said open cage structure in bearings the axis of which is longitudinal of said tube, a weighted pendulum member mounted in said open frame on pivots the axis of which is transverse to said longitudinal axis, a circular gauge carried by said open frame co-axial with said pendulum, pointers on said pendulum co-operative with said gauge, a compass mounted on said pendulum with its axis arranged in right angular relation to the pivot axis of the pendulum, and a transparent solidifiable fluid investing the mechanism contained in said tube adapted to hold the parts in adjusted positions to be read through the solidified material.

4. In a clinometer for surveying bore holes, in combination, a transparent tubular container adapted to be filled with a congealable transparent medium, spaced support means firmly positioned within said container leaving the transparent wall substantially unobstructed therebetween, a pivotal member substantially rotatably balanced in said support means to swing relative thereto to any rotative position about an axis disposed longitudinally of the portion of the bore hole in which the device may be located, a weighted pendant member having a transverse pivot connection with the aforesaid pivotal member for pivotal movement relative thereto about a complete circle and gravity-actuated to solely determine the rotative position of said first-mentioned pivotal member about its pivot axis, magnetically responsive means carried by said weighted member, and indicating means co-operatively carried by said pivotal member and said pendant member including a continuous circular scale capable of indicating their relative positions at any point in the complete revolution of said pendant member, all of said elements being adapted to be retained in their magnetically and gravitationally influenced relation within the transparent tubular container by the congealing of the transparent fluid and being readily visible through the transparent wall of the container from all sides.

ADOLPH CARLSON.